(12) United States Patent
Hur et al.

(10) Patent No.: US 9,390,007 B2
(45) Date of Patent: Jul. 12, 2016

(54) METHOD AND APPARATUS FOR PERFORMING ADAPTIVE MEMORY BANK ADDRESSING

(71) Applicant: SAMSUNG ELECTRONICS CO., LTD., Suwon-si, Gyeonggi-do (KR)

(72) Inventors: Jae Young Hur, Hwaseong-si (KR); Sang woo Rhim, Yongin-si (KR); Beom Hak Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/452,586

(22) Filed: Aug. 6, 2014

(65) Prior Publication Data

US 2014/0347382 A1     Nov. 27, 2014

Related U.S. Application Data

(63) Continuation of application No. 12/903,368, filed on Oct. 13, 2010, now Pat. No. 8,817,033.

(30) Foreign Application Priority Data

Dec. 30, 2009   (KR) .................. 10-2009-0134573

(51) Int. Cl.
  *G06F 12/06*   (2006.01)
  *G06F 12/02*   (2006.01)
(52) U.S. Cl.
  CPC ........ *G06F 12/0292* (2013.01); *G06F 12/0607* (2013.01)

(58) Field of Classification Search
  None
  See application file for complete search history.

(56) References Cited

U.S. PATENT DOCUMENTS

| | | | |
|---|---|---|---|
| 5,815,168 A | 9/1998 | May | |
| 5,841,446 A | 11/1998 | Dai | |
| 5,990,912 A * | 11/1999 | Swanson | 345/568 |
| 6,064,407 A | 5/2000 | Rogers | |
| 6,310,647 B1 * | 10/2001 | Parulski et al. | 348/231.99 |
| 6,484,179 B1 | 11/2002 | Roccaforte | |
| 6,553,552 B1 | 4/2003 | Khan et al. | |
| 7,016,418 B2 | 3/2006 | Wang et al. | |
| 2002/0174292 A1 * | 11/2002 | Morita et al. | 711/105 |
| 2003/0107578 A1 * | 6/2003 | Willis et al. | 345/545 |
| 2008/0079744 A1 * | 4/2008 | Xu | G06T 15/04 345/552 |
| 2008/0158601 A1 * | 7/2008 | Tu et al. | 358/1.16 |
| 2009/0009523 A1 | 1/2009 | Wise et al. | |

FOREIGN PATENT DOCUMENTS

| | | |
|---|---|---|
| JP | 10-143426 | 5/1998 |
| JP | 3203124 | 6/2001 |

* cited by examiner

*Primary Examiner* — Maurice L McDowell, Jr.
*Assistant Examiner* — Donna J Ricks
(74) *Attorney, Agent, or Firm* — Volentine & Whitt, PLLC (57) ABSTRACT

A display system comprises a mapping memory comprising a plurality of memory banks configured to store a plurality of image tiles corresponding to an image, and an image mapping component configured to assign each of the plurality of tiles to one of the plurality of memory banks according to a first mapping or a second mapping, wherein the image mapping component determines whether to use the first or second mapping based on a bank interleaving metric of the first and second mappings.

19 Claims, 12 Drawing Sheets

| ① Bank 0 | ② Bank 1 | ③ Bank 2 |
| --- | --- | --- |
| ④ Bank 3 | ⑤ Bank 0 | ⑥ Bank 1 |
| ⑦ Bank 2 | ⑧ Bank 3 | ⑨ Bank 0 |
| ⑩ Bank 1 | ⑪ Bank 2 | ⑫ Bank 3 |

| Mode T | TM Mode | | BF Mode | |
|---|---|---|---|---|
| | Bank Mapping | BI | Bank Mapping | BI |
| 4 | | Worst | | Best |
| 5 | | -- | | -- |
| 6 | | Best | | Worst |
| 7 | | -- | | -- |

$$\left[ T = \frac{ImgH}{\left(\frac{Page\ Size}{TileV}\right)} \right]$$

Fig. 9A (Row1, Col1):Compare[(0,1)+(0,0)+(0,1)]=1+0+1=2
(Row1, Col2):Compare[(1,0)+(1,1)+(1,2)]=1+1+0+1=4
(Row1, Col3):Compare[(2,1)+(2,2)+(2,3)]=1+1+0+1+1=4
(Row1, Col4):Compare[(3,2)+(3,3)]=1+1+0=2

Metric
=60/16
=3.8

Fig. 9B (Row1, Col1):Compare[(0,1)+(0,2)+(0,3)]=1+1+1=3
(Row1, Col2):Compare[(1,0)+(1,2)+(1,3)]=1+1+1+1+1=5
(Row1, Col3):Compare[(2,0)+(2,1)+(2,3)+(2,3)]=1+1+1+1+1=5
(Row1, Col4):Compare[(3,0)+(3,1)+(3,2)]=1+1+1=3

Metric
=84/16
=5.3

METHOD AND APPARATUS FOR PERFORMING ADAPTIVE MEMORY BANK ADDRESSING

CROSS-REFERENCE TO RELATED APPLICATIONS

This is a Continuation of U.S. application Ser. No. 12/903,368, filed Oct. 13, 2010, which claims priority under 35 U.S.C. §119 to Korean Patent Application No. 10-2009-0134573 filed on Dec. 30, 2009, the disclosure of which is hereby incorporated by reference in its entirety.

BACKGROUND

Embodiments of the inventive concept relate generally to electronic display technologies. More particularly, embodiments of the inventive concept relate to display systems that perform memory mapping based on image characteristics such as image format or size.

Many electronic devices incorporate a display system for presenting visual information to a user. Examples of such devices include notebook computers, cellular phones, personal digital assistants, and digital cameras, to name but a few.

A display system typically comprises a display and a mapping memory for storing image information to be shown on the display. The mapping memory stores the image information in memory locations that map to corresponding portions of the display. The mapping memory can store information to indicate how the stored image information maps onto the display.

In some display systems, image information is mapped to the mapping memory in units of tiles, where a tile comprises a region of an image, such as a rectangular segment. The shape and size of the tiles can be modified by a system designer based on various system characteristics or preferences. Each tile can be stored at an independent location in the mapping memory where it can be accessed independent of the other tiles. For instance, the tiles can be stored in different memory banks that be accessed in parallel.

By storing and accessing image tiles in parallel, the display system can improve the speed of refresh operations for the display. In addition, the display system can further improve the speed of refresh operations by reducing access latency of the mapping memory.

SUMMARY

According to an embodiment of the inventive concept, a system comprises a mapping memory comprising a plurality of memory banks configured to store a plurality of image tiles corresponding to an image, and an image mapping component configured to assign each of the plurality of tiles to one of the plurality of memory banks according to a first mapping or a second mapping, wherein the image mapping component determines whether to use the first or second mapping based on a bank interleaving metric of the first and second mappings.

In certain embodiments, the system further comprises a display configured to display a selected area of the image by accessing the image tiles from the mapping memory.

In certain embodiments, the first mapping is generated by a tile mapping method, and the second mapping is generated by performing bank flipping on bank assignments of the image tiles in the first mapping.

In certain embodiments, the bank flipping is performed only on the bank assignments of image tiles in even rows of the image or only on the bank assignments of image tiles in odd rows of the image.

In certain embodiments, the tile mapping method maps the image tiles to the memory banks in a sequential order corresponding to sequential locations of the image tiles within the image.

In certain embodiments, the bank flipping is performed by toggling a most significant bit of bank assignments.

In certain embodiments, the image mapping component calculates a number of image tiles that can be accommodated across a horizontal size of the image to determine the bank interleaving metric for the first and second mappings.

In certain embodiments, the image mapping component calculates the number of image tiles based on a page size of the mapping memory.

In certain embodiments, the image mapping portion comprises a processor configured to output image data related to the image, and an address generator configured to output the first address or the second address to the mapping memory based on the image data.

In certain embodiments, the address generator comprises a tile mapping address generator configured to create the first mapping based on the image data, a detector configured to select the first mapping or the second mapping according to which mapping produces more bank interleaving in the mapping memory with respect to the image tiles, an address converter configured to convert the first mapping into the second mapping under the control of the detector, and an address select portion configured to selectively output the first address or the second address under the control of the detector.

In certain embodiments, the detector calculates a number of image tiles that can be accommodated in a horizontal dimension of the image, and controls the address select portion to select the second address if the number of image tiles falls within a predetermined bank flipping range.

According to another embodiment of the inventive concept, a method is provided for performing address mapping for storing an image in a memory comprising a plurality of banks. The method comprises generating a first mapping that divides the image into a plurality of tiles and assigns each of the tiles to one of the plurality of banks, determining whether the first mapping assigns any two adjacent tiles of the image to the same bank, and upon determining that the first mapping assigns two adjacent tiles of the image to the same bank, generating a second mapping by modifying the first mapping.

In certain embodiments, the method further comprises calculating a number of tiles that can be accommodated within a horizontal dimension of the image.

In certain embodiments, the method further comprises determining whether to use the first mapping or the second mapping to store the tiles in the memory, based on the number of tiles that can be accommodated within the horizontal dimension and a page size of the banks.

In certain embodiments, generating the second mapping by modifying the first mapping comprises toggling a most significant bit of a bank assignment included in the first mapping.

In certain embodiments, generating the second mapping by modifying the first mapping comprises modifying bank assignments for tiles in even rows of the image but not for tiles in odd rows of the image.

In certain embodiments, the method further comprises selecting the first mapping or the second mapping and providing the selected mapping to the memory.

According to another embodiment of the inventive concept, a method is provided for mapping a plurality of image tiles onto a plurality of memory banks in a mapping memory. The method comprise generating a first mapping to assign each of the image tiles to one of the plurality of memory banks, the first mapping having a first bank interleaving metric, generating a second mapping by modifying the first mapping to assign at least one of the image tiles to a different one of the plurality of memory banks than in the first mapping, the second mapping having a second bank interleaving metric, selecting the first or second mapping based on a comparison between the first and second bank interleaving metrics, and storing the image tiles in the mapping memory using the first or second mapping based on the comparison.

In certain embodiments, the mapping memory comprises a synchronous dynamic random access memory.

In certain embodiments, the comparison between the first and second bank interleaving metrics determines which of the first and second bank interleaving metrics is greater.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

In the description that follows, a synchronous dynamic random access memory (SDRAM) is used as an example of a mapping memory to describe various features of the inventive concept. The inventive concept, however, can also be embodied in other types of memories, such as static random access memory (SRAM), phase-change random access memory (PRAM), magnetoresistive random access memory (MRAM), resistive random access memory (ReRAM), ferroelectric random access memory (FRAM), or NOR flash memory.

Figure 1:
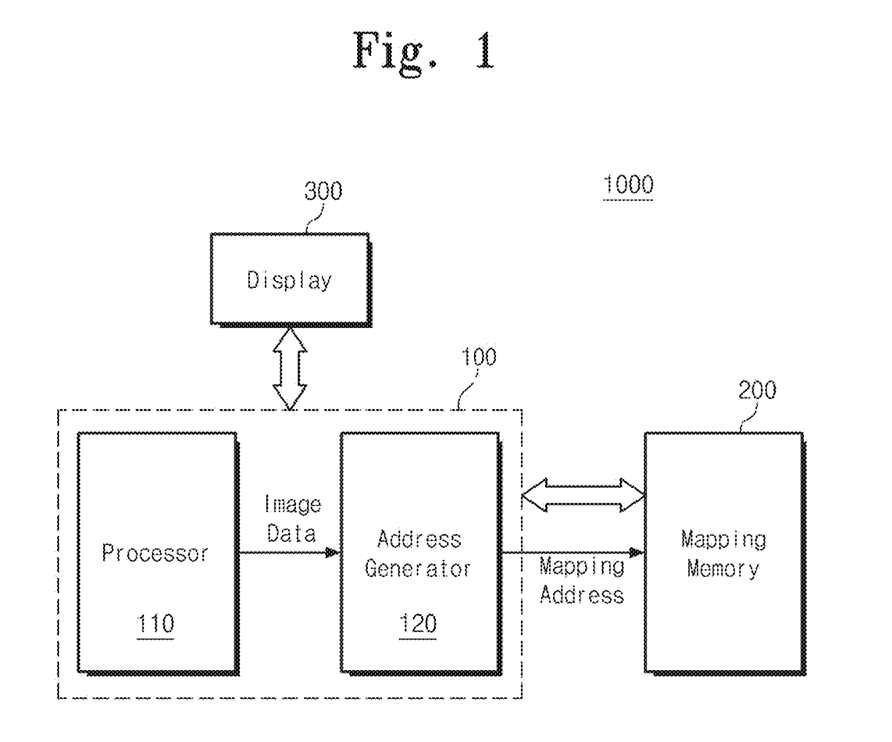
FIG. 1 is a block diagram of a display system in accordance with an embodiment of the inventive concept.

FIG. 1 is a block diagram illustrating a display system 1000 in accordance with an embodiment of the inventive concept. Referring to FIG. 1, display system 1000 comprises an image mapping component 100 that generates image data and mapping addresses, a mapping memory 200, and a display 300. Image mapping component 100 comprises a processor 110 and an address generator 120.

Processor 110 generates an image and divides the image into a plurality of tiles. A user, such as a person, application program, or operating system, selects an area of the image to display on display 300, and processor 110 transmits image data to address generator 120 to indicate the location of the selected image area. The image data typically comprises a size of the image, a size of the tiles, and a location and size of the selected image area.

Address generator 120 generates mapping addresses for the tiles based on the image data. Each mapping address indicates a location of mapping memory 200 for storing a tile. For instance, in some embodiments, each mapping address assigns a tile to a different page of a memory bank of mapping memory 200. Different tiles can also be assigned to different memory banks of mapping memory 200.

Address generator 120 analyzes the tiles to identify address mappings that can improve data access time for the selected image area. Improving the data access time can allow the selected image area to be displayed more efficiently on display 300. In some embodiments, address generator 120 identifies address mappings that avoid certain access overhead problems such as Open-Row-Access delays. As will be explained below, an Open-Row-Access delay occurs where a first read operation is being performed on a first row of a memory bank and a second read operation is requested for a second row of the same memory bank. To perform the second read operation, the first row must be closed, and the first row must be opened, which increases the access time of the second row.

In some embodiments, address generator 120 determines address mappings by evaluating different candidate address mappings with respect to the tiles and selecting a best address mapping from among the candidate address mappings. The best address mapping can be, for instance, a candidate address mapping that provides lower access overhead compared with the other candidate address mappings.

Mapping memory 200 comprises a plurality of banks that can be independently accessed. Each of the memory banks comprises a plurality of rows each constituting a page. In some embodiments, each page stores one tile of an image. However, the relationship between a page and a tile is not limited to a one-to-one mapping. Rather, the size of a page can be larger or smaller than the size of a tile.

Display 300 displays the selected image area stored in mapping memory 200. In certain embodiments, display 300 comprises one of various digital display apparatuses, such as an LCD monitor or a CRT monitor.

Figure 2:
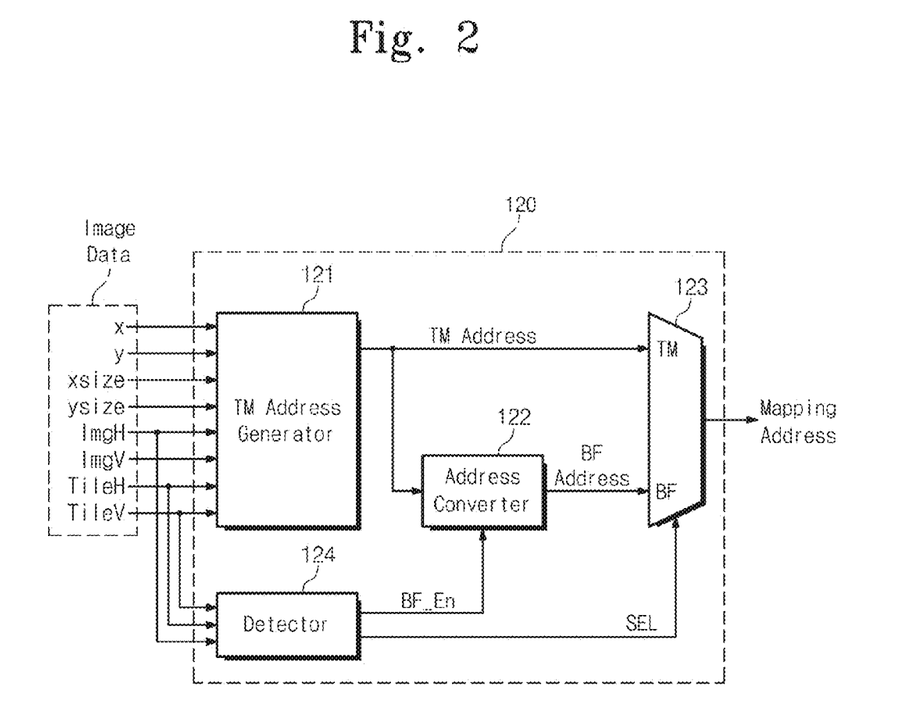
FIG. 2 is a block diagram of an address generator illustrated in FIG. 1.

FIG. 2 is a block diagram illustrating an embodiment of address generator 120 of FIG. 1. In the embodiment of FIG. 2, address generator 120 comprises a tile mapping address generator 121, an address converter 122, an address select portion 123 and a detector 124.

Tile mapping address generator 121 receives image data regarding the image generated by processor 110 and produces a tile mapping address (TM address) based on the image data.

The image data provided to tile mapping address generator 121 comprises location information (x, y) and size information (xsize, ysize) of the selected image area, size information (ImgH, ImgV) of the whole image, and size information (TileH, TileV) of a tile. Tile mapping address generator 121 creates the tile mapping address for storing the tiles in mapping memory 200.

Address converter 122 converts the tile mapping address output from tile mapping address generator 121 into a bank flip address (BF address) in response to a bank flip enable signal (BF_En) generated by detector 124. An example of this conversion will be described with reference to FIG. 6.

Address select portion 123 selects the tile mapping address or the bank flip address in response to a select signal (SEL) provided from detector 124. The selected address is provided to mapping memory 200 as a mapping address for the tiles. An address mapping method using the tile mapping address will be referred to as a tile mapping method, and an address mapping method using the bank flip address will be referred to as a bank flip mapping method.

Detector 124 selects an address mapping method based on the image data. For instance, detector 124 can calculate the address mapping method based on the format or size of the image. Detector 124 can also perform calculations for selecting a mapping method of a bank address using the number of banks, the page size of mapping memory 200, or other factors.

In one embodiment, detector 124 determines an address mapping method by calculating a number (T value) of tiles that can be accommodated within the horizontal size of the image, and then determining whether the tile mapping method or the bank flip mapping method is best suited for address mapping of tiles that are divided according to the T value. In addition to performing address mapping according to the T value, detector 124 can also perform address mapping according to a location of the selected image area within the tiles, as will be explained with reference to FIGS. 4 through 8.

In some embodiments, address generator 120 generates an address mapping based on a structure of mapping memory 200 and characteristics of an image to be displayed. For instance, where a user selects a specific area of an image, address generator 120 can generate an address mapping that reduces the overhead required to access the selected image area, such as Open-Row-Access delays.

Figure 3:
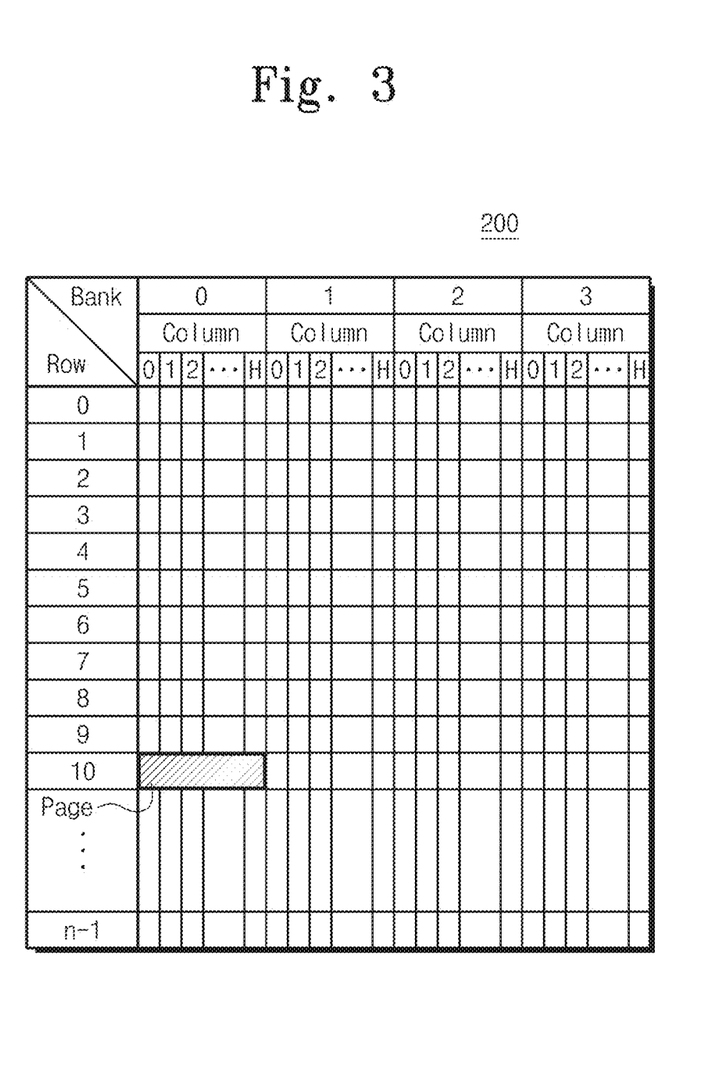
FIG. 3 is a table illustrating the structure of a mapping memory illustrated in FIG. 1.

FIG. 3 is a table illustrating a memory area of mapping memory 200. Referring to FIG. 3, the memory area of mapping memory 200 is divided into a plurality of banks. Each of the banks comprises "n" rows and "H+1" columns. Each row of each bank constitutes a page. For example, a page is indicated by a shaded area in a row 10 of a bank 0. A bank can be accessed in a page unit. Such access is called a page mode access.

Each of the banks supports independent access. Accordingly, while a read operation is performed on a row of one bank, another read operation can be simultaneously performed on a row of a different bank. Consequently, access overhead such as Open-Row-Access delays can be avoided by assigning mapping addresses allowing different tiles of the selected image area to be accessed from different memory banks.

Figure 4A:
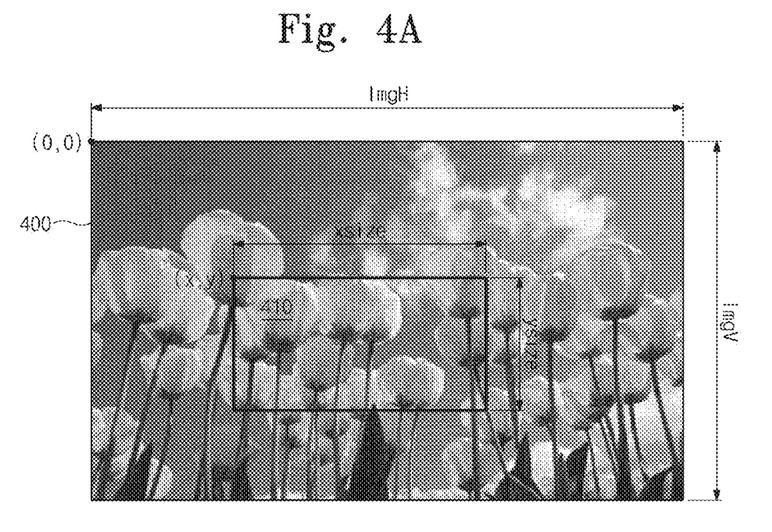
FIGS. 4A through 4D are diagrams illustrating an address generation process performed by a tile mapping address generator of FIG. 2.
Figure 4B:
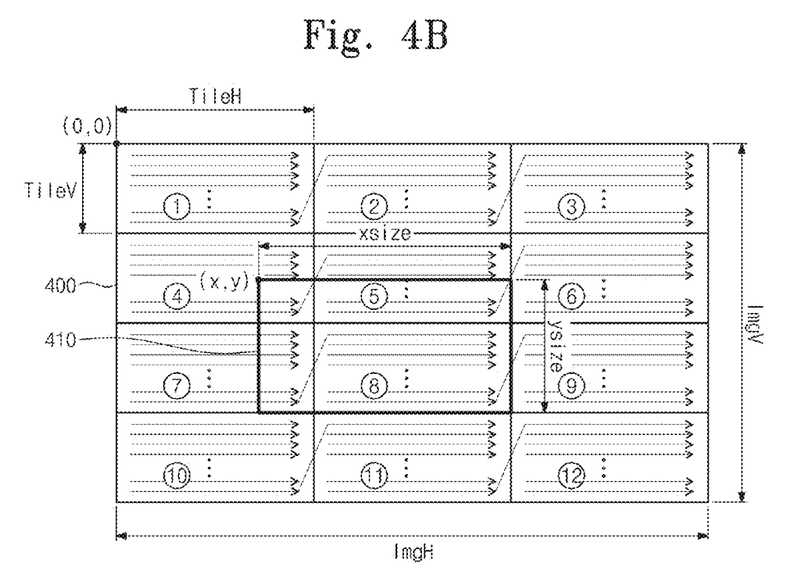
Figure 4C:
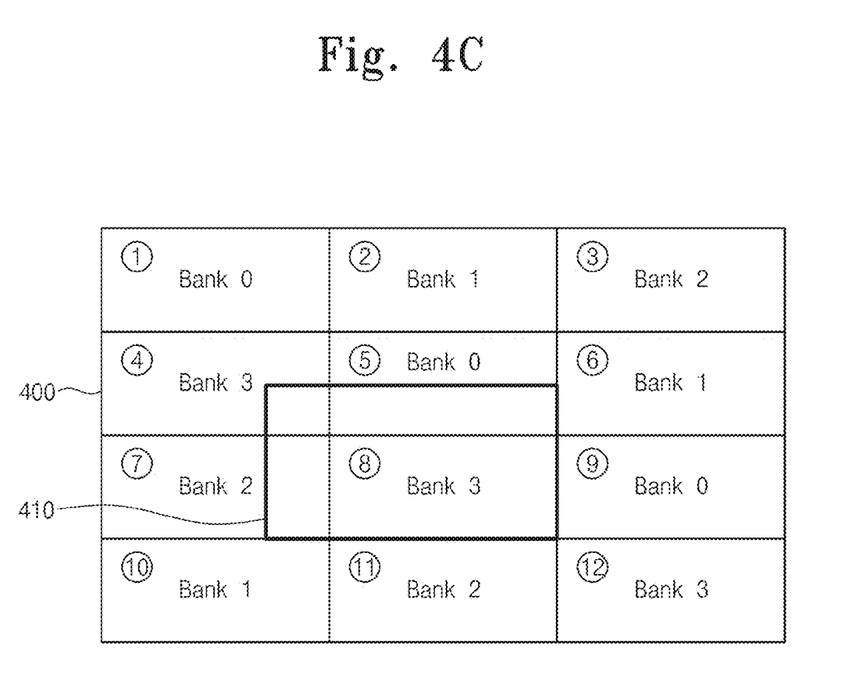
Figure 4D:
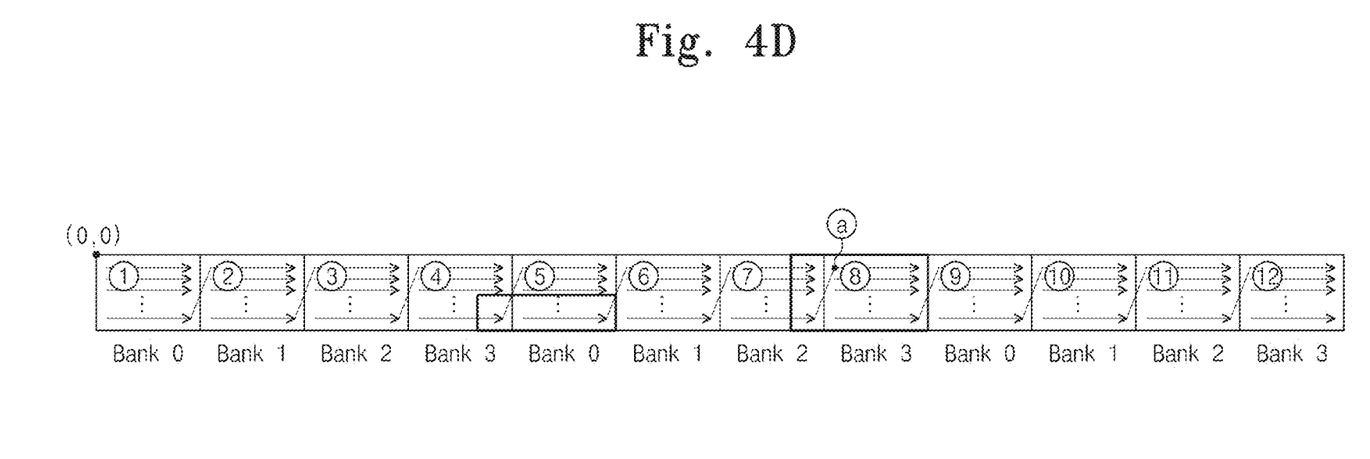

FIGS. 4A through 4D are diagrams illustrating an address generation process of tile mapping address generator 121 illustrated in FIG. 2. In particular, FIG. 4A illustrates an example image for explaining the process, and FIGS. 4B through 4D illustrate the division of the image into tiles and assignment of the tiles to memory banks of mapping memory 200.

Referring to FIG. 4A, an image 400 is stored in mapping memory 200 by units of tiles, where each tile corresponds to a set of pixel data of image 400. The pixel data of a tile is stored in a physical address on mapping memory 200 created by tile mapping address generator 121.

In FIGS. 4A, 4B and 4C, a selected image area 410 has a location (x, y) and a size (xsize, ysize) from image 400. Pixel data of selected image area 410 can be included in one tile or a plurality of tiles. The tiles of selected image area 410 are mapped to mapping addresses of mapping memory 200 using a tile mapping or a bank flip mapping method. The choice of mapping method can be determined by a performance metric such as Open-Row-Access delay. For instance, the choice between the tile mapping method and the bank flip method can be determined by which method minimizes Open-Row-Access delays with respect to selected image area 410.

FIG. 4B is a diagram illustrating an example where image 400 of FIG. 4A is divided into a plurality of tile units spanning three horizontal units and four vertical units. Tile numbers (1) through (12) are assigned to each of the tiles, and pixel data in each of the tiles is mapped to a page of mapping memory 200. Arrows in each of the tiles indicate the logical address order of the pixel data. For instance, rows of pixel data in tile (1) are located at consecutive logical addresses, and a first row of pixel data in tile (2) is located at a logical address following the last row of tile (1). Pixel data of the selected area 410 is mapped to four tiles (4), (5), (7), and (8).

FIG. 4C is a diagram illustrating a mapping between tiles (1) through (12) and four memory banks Bank 0 through Bank 3 of mapping memory 200. For explanation purposes, it will be assumed that pixel data and a page capacity of mapping memory 200 and the size of one tile are both 2 KByte. In the example of FIG. 4C, tile (1) is assigned to a Bank 0 of mapping memory 200, tile (2) is assigned to Bank 1, tile (3) is assigned to Bank 2, tile (4) is assigned to Bank 3, and so on. As tile number increases, Bank 0 through Bank 3 are assigned to the tiles in a repeating sequence.

In the example of FIG. 4C, the four tiles corresponding to selected image area 410 are all assigned to three different memory banks. In particular, tiles (4), (5), (7), and (8) are assigned to respective banks Bank 3, Bank 0, Bank 2, and Bank 3. Because tiles (4) and (8) are both assigned to Bank 3, an Open-Row-Access delay occurs in a refresh operation performed on display 300 with respect to selected image area 410.

FIG. 4D is a diagram illustrating the tiles of FIG. 4B arranged in a straight line according to their logical addresses (also referred to as pixel addresses). Referring to FIG. 4D, any one pixel address of the image can be uniquely defined by a distance from a coordinate (0, 0). For instance, assuming that a size of one tile is 2 KByte, a location of a pixel "(a)" can be represented by 14336 (2 KByte×7). This is because seven tiles are included before pixel (a).

Figure 5:
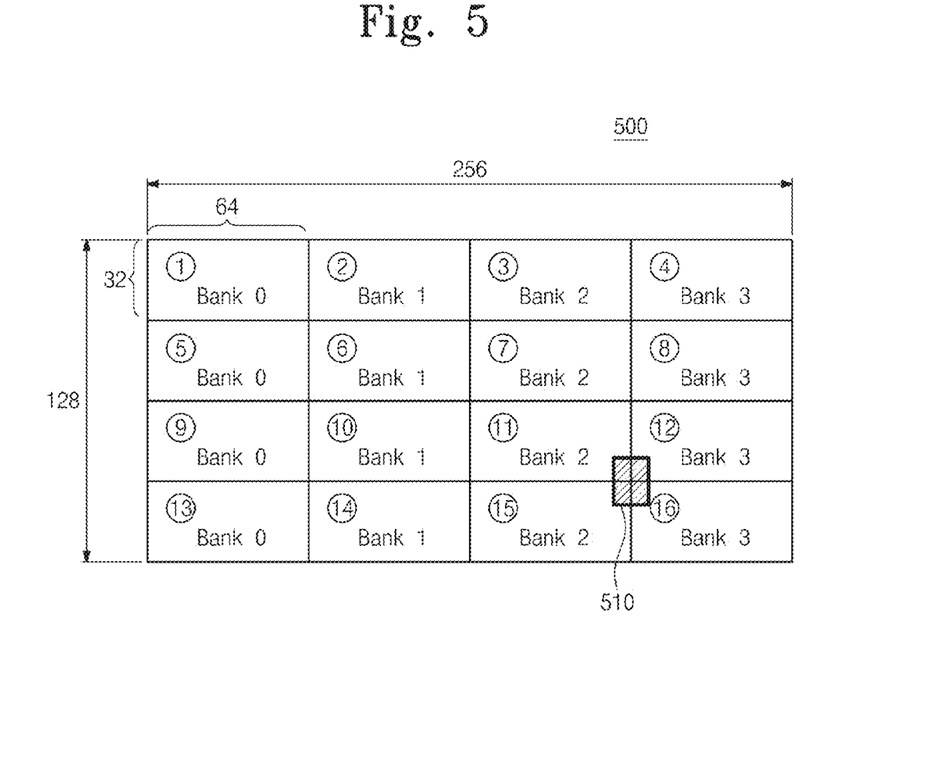
FIG. 5 is a diagram illustrating an address generation process in which the number of tiles across a horizontal dimension of an image is larger than in the embodiment of FIGS. 4A through 4D.

An example of a tile mapping operation is described above with reference to FIGS. 4A through 4D. In the example of FIGS. 4A through 4D, Open-Row-Access delays occur in one bank. In the example of FIG. 5, described below, additional Open-Row-Access delays occur due to a different tiling configuration.

FIG. 5 is a diagram illustrating an address generation process in which the number of tiles across a horizontal dimension of an image is larger than in the example of FIGS. 4A through 4D. In particular, in the example of FIG. 5, an image 500 is divided into four tiles along a horizontal dimension.

In FIG. 5, image 500 has dimensions of 256×128, and a tile size of 64×32. Accordingly, tiles (1), (5), (9), and (13) are located in the same column on image 500, and are also mapped to the same bank. Similarly, other tiles in the same column are also mapped to the same bank. Accordingly, where a user selects a specific area of image 500, there is a good chance that the selected area will produce an Open-Row-Access delay. As an example, FIG. 5 shows a selected image area 510 that encompasses two tiles (11) and (15) mapped to Bank 2, and two tiles (15) and (16) mapped to Bank 3. When reading pixel data of tiles (11) and (15), different rows of Bank 2 of mapping memory 200 must be accessed. As a result, an Open-Row-Access delay occurs.

Figure 6:
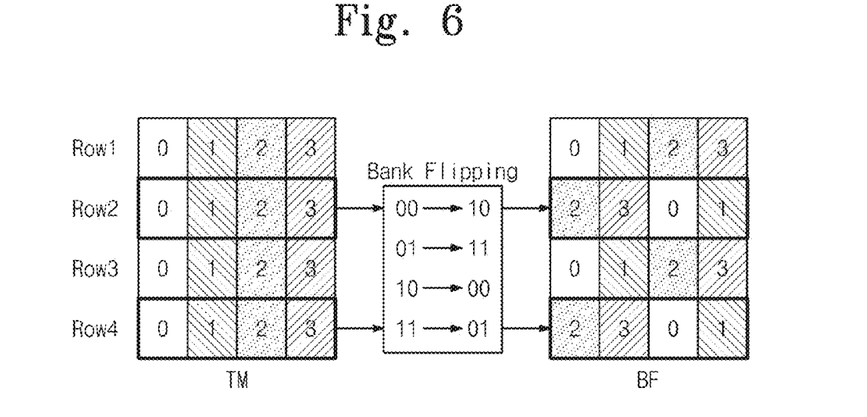
FIG. 6 is a diagram illustrating a bank flip method for address mapping according to an embodiment of the inventive concept.

FIG. 6 is a block diagram illustrating a bank flipping operation performed in address converter 122 of FIG. 2. In FIG. 6, a left block is labeled "TM" to indicate an address mapping generated by a tile mapping operation, and a right block is labeled "BF" to indicate an address mapping generated by performing a bank flipping operation relative to the address assignments in the left block of FIG. 6.

In FIG. 6, the numbers 0 through 3 indicate bank assignments of different tiles of image 500. For instance, in the left block of FIG. 6, tiles in a left-most column of image 500 are all assigned to Bank 0. Similarly in a right block of FIG. 6, tiles in different columns are assigned to Bank 0. Due to the configuration of bank assignments in FIG. 6, there is a higher probability of Open-Row-Access delay in the tile mapping operation compared with the bank flipping operation.

A bank flipping operation reassigns bank addresses according to a specific rule so that adjacent tiles are assigned to different bank addresses from one another. In the bank flipping operation of FIG. 6, bank addresses are reassigned only in even rows of tiles. However, in other embodiments, bank addresses can be reassigned in other rows. For instance, a bank flipping operation could be performed on even rows of tiles.

The bank flipping operation of FIG. 6 is accomplished by toggling a most significant bit (MSB) of a bank addresses in the even rows of tiles. In particular, a tile assigned to a bank '00' (Bank 0) is reassigned to a bank '10' (Bank 2), a tile assigned to a bank '01' (Bank 1) is reassigned to a bank '11' (Bank 3), a bank '10' is reassigned to a bank '00', and a tile assigned to a bank '11' is reassigned to a bank '01'.

Figure 7:
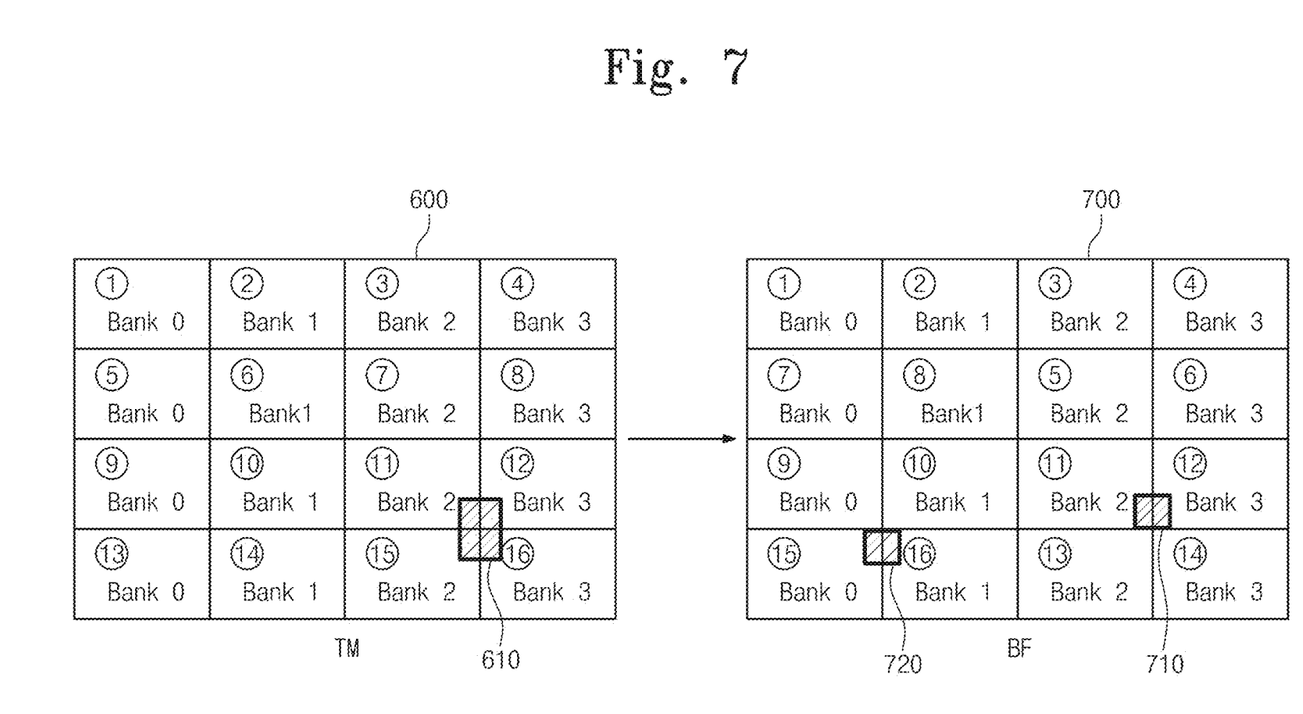
FIG. 7 is a diagram illustrating a comparison of an address mapping method performed without bank flipping and an address mapping operation performed with bank flipping.

FIG. 7 is a diagram illustrating an effect performing address mapping with a tile mapping operation versus a bank flip operation. In particular, FIG. 7 shows an image 600 in which tiles (1) through (16) are assigned to banks Bank 0 through Bank 3 using tile mapping operation, and an image 700 in which tiles (1) through (16) are reassigned to different banks compared with image 600.

In image 600, a selected image area 610 encompasses two tiles (11) and (15) that are mapped to Bank 2, and two tiles (15) and (16) that are mapped to Bank 3. Accordingly, rows of different tiles in the same bank must be accessed in order to display selected image area 610 image 600, which can lead to Open-Row-Access delays.

In image 700, selected image areas 710 and 720 correspond to selected image area 610 of image 600. Due to the bank reassignment performed by the bank flipping operation, selected image areas 710 and 720 do not encompass multiple tiles that are mapped to the same bank. Consequently, the address mapping of image 700 reduces the amount of Open-Row-Access delay compared with the address mapping of image 600.

In certain embodiments, Open-Row-Access is reduced by minimizing the number of adjacent tiles that are mapped to the same memory bank of mapping memory 200. One measure of the relative number adjacent tiles that are mapped to the same memory bank of mapping memory 200 is referred to as "bank interleaving". In general, bank interleaving refers to the degree to which adjacent tiles are mapped to different memory banks of mapping memory 200. Accordingly, a higher degree of bank interleaving indicates that fewer adjacent tiles are mapped to the same memory bank of mapping memory 200.

In some devices, the degree of bank interleaving is increased by performing address mapping using the bank flip method as described in relation to FIGS. 6 and 7. Accordingly, certain embodiments use bank interleaving as a metric for determining whether to use the bank flip method in place of the tile mapping method. Where bank interleaving is higher under the bank flip method versus the tile mapping method, the bank flipping operation can be used to perform address mapping. Otherwise, the tile mapping method can be used to perform address mapping.

Figure 8:
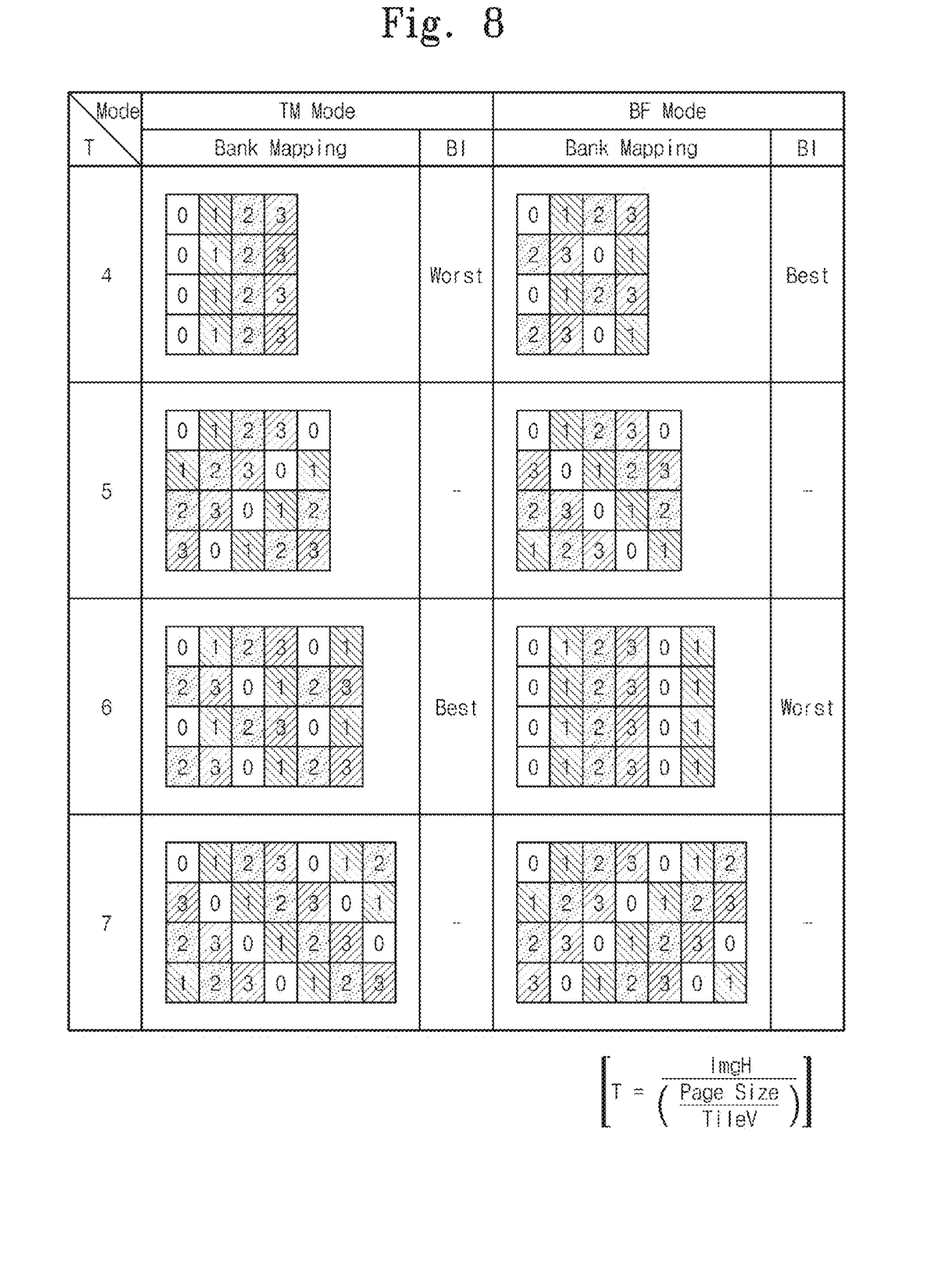
FIG. 8 is a table illustrating a degree of bank interleaving in various images where address mapping is performed using a tile mapping method or a bank flip method.

FIG. 8 is a table for comparing the bank interleaving of the tile mapping method and the bank flip method for images having different numbers of columns. A column under the heading "TM Mode" includes images in which address mapping is performed using the tile mapping method, and a column under the heading "BF Mode" includes images in which address mapping is performed using the bank flip method.

In the table of FIG. 8, each image comprises four rows of tiles. Each image comprises a different number of tiles ranging from four to seven, as indicated under the heading "T". The tiles are mapped onto four memory banks numbered 0 through 3, as indicated by the numbers in each box of the images. Bank flipping is performed on even rows of the images to generate the images under "BF Mode". A column labeled "BI" indicates a rough measure of bank interleaving in each of the images. For instance, the label "Worst" indicates that bank interleaving is relatively low in the first image of the "TM Mode" column.

The heading "T" indicates a relationship between the size of the image and the size of tiles. "T" varies according to the page size of mapping memory 200, and can be defined by the following equation (1).

$$T = \text{Img}H/(\text{Page Size}/\text{Tile}V) \qquad (1)$$

In equation (1), ImgH represents a horizontal size of the image, TileV represents a vertical size of a tile, and Page Size represents the page size of the mapping memory 200. For explanation purposes it will be assumed that the tile size is 64×32, mapping memory 200 has a four-bank structure and an each size of the pages is 2 KByte. In this example, T corresponds to the number of tiles included in each row of the image.

Where T is four, the tile mapping method maps all tiles in the same column to the same bank. Accordingly, the degree of bank interleaving is at a minimum, as indicated by the "Worst" label. With this mapping, the probability of Open-Row-Access delays is relatively high, similar to image 600 in FIG. 7.

On the other hand, under the bank flip method or mode (BF mode), where T is 4, no adjacent tiles are mapped onto the same bank. Accordingly a degree of bank interleaving is at a maximum, as indicated by the "Best" label. With this mapping, the probability of a problem such as Open-Row-Access occurs is relatively low, similar to image 700 in FIG. 7.

Where T is five, the number of tiles which can be accommodated in one row of the image is five. Where T is five, the tile mapping method or mode (TM mode) produces a degree of bank interleaving that is higher than where T is four. However, tiles having the same bank address are still adjacent in a diagonal direction. Accordingly, the degree of bank interleaving where T is five is neither a maximum nor a minimum, as indicated by the label "–" under "BI". Where T is five, the degree of bank interleaving is similar under the bank flip method or mode (BF mode), as indicated by the label "–" under "BI".

Where T is six, the number of tiles that can be accommodated in one row of the image is six. Where T is six, the tile mapping method produces a maximum degree of bank interleaving because no adjacent tiles are mapped to the same bank. Accordingly, a probability of Open-Row-Access delays is relatively low. On the other hand, under the bank flip mapping method where T is six, all tiles in the same column on the image are mapped on the same bank. Accordingly, the degree of bank interleaving is at a minimum or worst level.

Where T is seven, the number of tiles that can be accommodated in one row of the image is seven. Where T is seven, the tile mapping operation produces a lower degree of bank interleaving than where T is six, but a higher degree of interleaving than where T is 4. Similarly, where T is seven, the bank flip method produces a higher degree of interleaving than where T is 6, but a lower degree of interleaving than where T is 4.

As indicated by the table of FIG. 8, the tile mapping method produces superior bank interleaving than the bank flip method for some image formats or sizes, and vice versa. Accordingly, it can be advantageous to adaptively determine an address mapping method based on an image format or size.

Figure 9A:
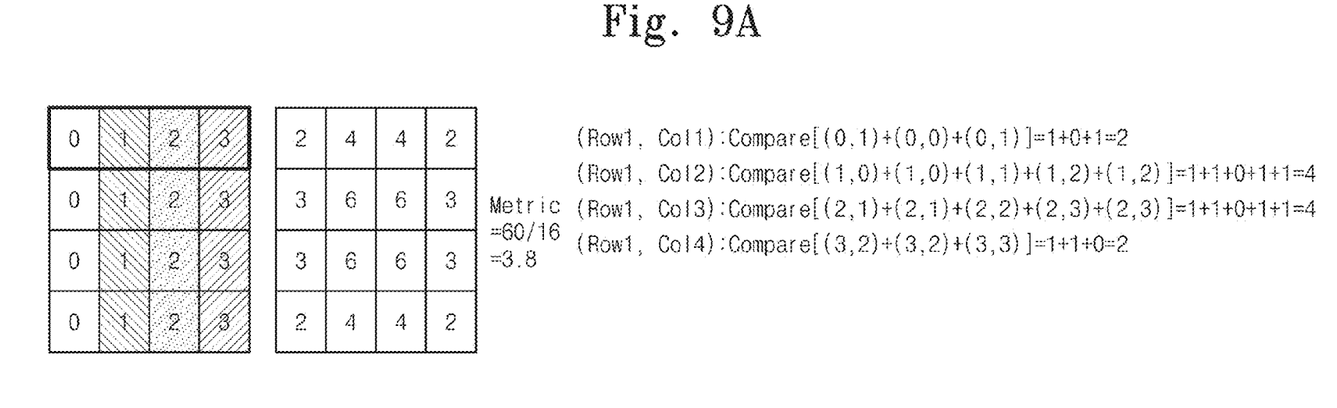
FIGS. 9A and 9B are diagrams illustrating methods of quantifying bank interleaving.
Figure 9B:
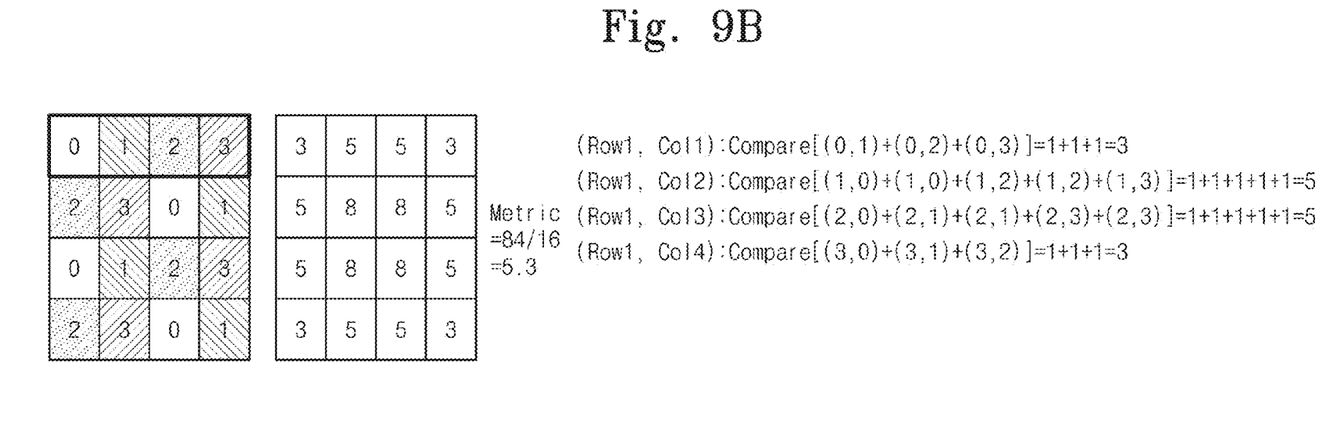

FIGS. 9A and 9B are diagrams illustrating a method of quantifying the degree of bank interleaving in images using different address mappings. The method of FIGS. 9A and 9B is illustrated with respect to the two images in FIG. 8 for which T is four. More specifically, FIG. 9A shows an example where the method is applied to the image of FIG. 8 where address mapping is performed by the tile mapping method, and FIG. 9B shows an example where the method is applied to the image of FIG. 8 where address mapping is performed by the bank flip method.

In FIGS. 9A and 9B, the images and the corresponding bank assignments of tiles are shown on the left, with different bank assignments indicated by numbers and also different forms of shading. To the right of the images are corresponding tables showing values of a sum $\Sigma_{x \in A}$ Compare($B_{i,j}, B_x$) that is computed for each tile. For instance, in the table of FIG. 9A, a top row of entries, "2", "4", "4", "2" are sums corresponding to the four tiles in the top row of the corresponding image. The above sum is explained below, together with a bank interleaving metric.

In the method of FIGS. 9A and 9B, a bank interleaving metric is calculated using the following equation (2).

$$\text{Metric} = (\Sigma_i \Sigma_j [\Sigma_{x \in A} \text{Compare}(B_{i,j}, B_x)]) / \text{Total number of tiles} \quad (2)$$

In Equation (2), "i" indicates a row of the image, "j" indicates a column of the image, and $B_{i,j}$ indicates a bank assignment of a tile at row "i" and column "j". "A" indicates a set of tiles adjacent to the tile at row "i" and column "j". The total number of tiles in this example is 16.

The function Compare($B_{i,j}, B_x$) compares the bank assignment of the tile at row "i" and column "j" with the bank assignment of an adjacent tile "x". Where bank assignments $B_{i,j}$ and $B_x$ are the same, Compare($B_{i,j}, B_x$) equals zero. Otherwise, Compare($B_{i,j}, B_x$) equals one. For example, in the example of FIG. 9A, the bank assignment of the tile at row 1, column 1 is "0", and the bank assignment of the adjacent tiles are "1", "0", and "1", respectively. Accordingly, $\Sigma_{x \in A}$ Compare($B_{1,1}, B_x$) is computed by adding Compare(0,1), Compare(0,0), and Compare(0,1). Compare(0,1) equals one, Compare (0,0) equals zero, and Compare(0,1) equals one. Thus, $\Sigma_{x \in A}$ Compare($B_{1,1}, B_x$)=1+0+1=2.

FIGS. 9A and 9B each show computations of the sum $\Sigma_{x \in A}$ Compare($B_{i,j}, B_x$) for a top row of the images. However, to compute the bank interleaving metric for the entire images, the sum $\Sigma_{x \in A}$ Compare($B_{1,1}, B_x$) is computed for all values of "i" and "j" in the images.

As indicated by FIG. 9A the bank interleaving metric for the tile mapping method is 60/16=3.8. As indicated by FIG. 9B the bank interleaving metric for the bank flip method is 84/16=5.3. Thus, according to the bank interleaving metric, the bank flip method produces greater bank interleaving than the tile mapping method. Accordingly, the bank flip method can be used to reduce Open-Row-Access delays compared with the tile mapping method.

Figure 10:
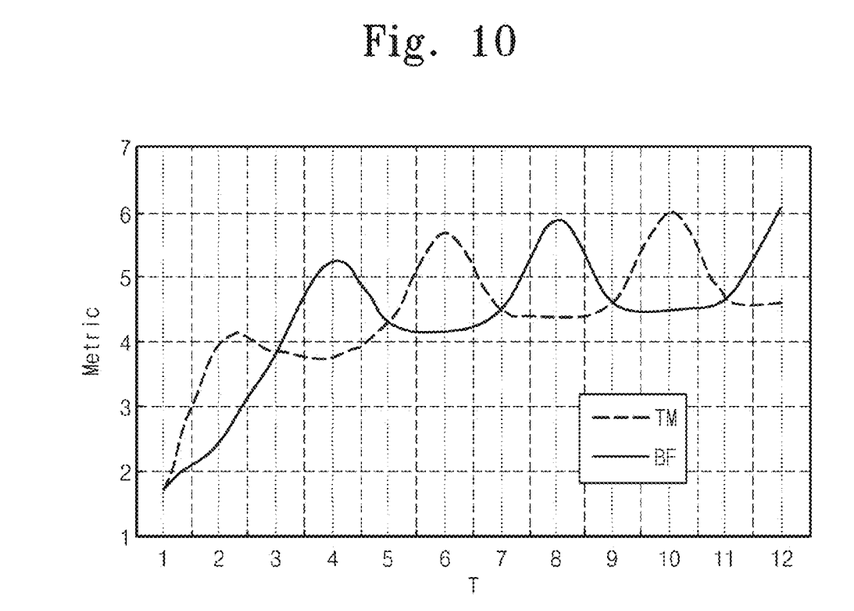
FIGS. 10 and 11 are graphs illustrating variations in bank interleaving as a function the number of tiles in each row of an image.
Figure 11:
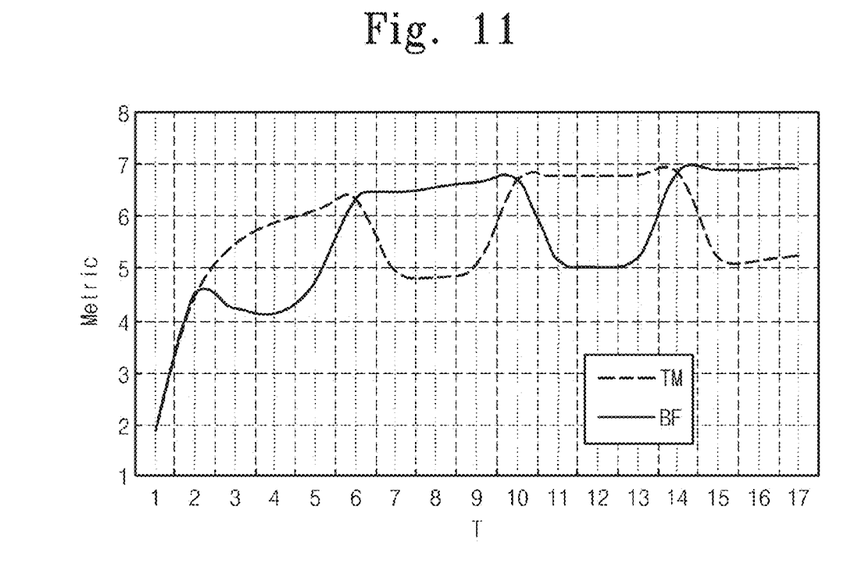

FIGS. 10 and 11 are graphs illustrating the bank interleaving metric as a function of T in mapping memory 200. In the example of FIG. 10, mapping memory 200 comprises four banks with pages each storing 2 KB. In the example of FIG. 11, mapping memory 200 comprises eight banks with pages each storing 4 KB.

FIG. 10 uses a dotted curve to illustrate the bank interleaving metric for images in which address mapping has been performed using the tile mapping method, and uses a solid curve to illustrate the bank interleaving metric for images in which address mapping has been performed using the bank flip method. As indicated by FIG. 10, for some values of T (e.g., 2, 6, 10), the tile mapping method produces a higher value of the bank interleaving metric than the bank flip method. For other values of T (e.g., 4, 6, 8, 12), the bank flip method produces a higher value of the bank interleaving metric than the tile mapping method. Accordingly, to maximize the bank interleaving metric, an address mapping method can be chosen based on the value of T.

FIG. 11 also uses a dotted curve to illustrate the bank interleaving metric for images in which address mapping has been performed using the tile mapping method, and uses a solid curve to illustrate the bank interleaving metric for images in which address mapping has been performed using the bank flip method. As indicated by FIG. 11, for some values of T (e.g., 3-5, 11-13), the tile mapping method produces a higher value of the bank interleaving metric than the bank flip method. For other values of T (e.g., 7-9, 15-17), the bank flip method produces a higher value of the bank interleaving metric than the tile mapping method. Accordingly, to maximize the bank interleaving metric, an address mapping method can be chosen based on the value of T.

As indicated by FIGS. 10 and 11, the tile mapping method and the bank flip method can be used for different ranges of T. Accordingly, detector 124 of FIG. 2 can determine an address mapping method for mapping memory 200 based on a value of T in combination with a number of banks and a page size of mapping memory 200. Detector 124 determines the method based on the image data provided by processor 110. Detector 124 computes the value "T" based on the image data and determines whether the computed value of T corresponds to the bank flip method or the tile mapping. This determination can be performed by detector 124 using the following equation (3).

$$\text{\# Banks} \times (n - \tfrac{1}{4}) < T < \text{\# Banks} \times (n + \tfrac{1}{4}) \quad (3)$$

In equation (3), "# Banks" is number of banks in mapping memory 200, and "n" is a natural number. Where T satisfies equation (3), detector 124 controls address converter 122 and address select portion 123 to perform address mapping using the bank flip method. Otherwise, detector 124 controls address converter 122 and address select portion 123 to perform address mapping using the tile mapping method.

Although certain embodiments of the inventive concept are described with reference to a mapping memory of a display system, the inventive concept can also be embodied by other memory platforms using a plurality of memory banks.

Figure 12:
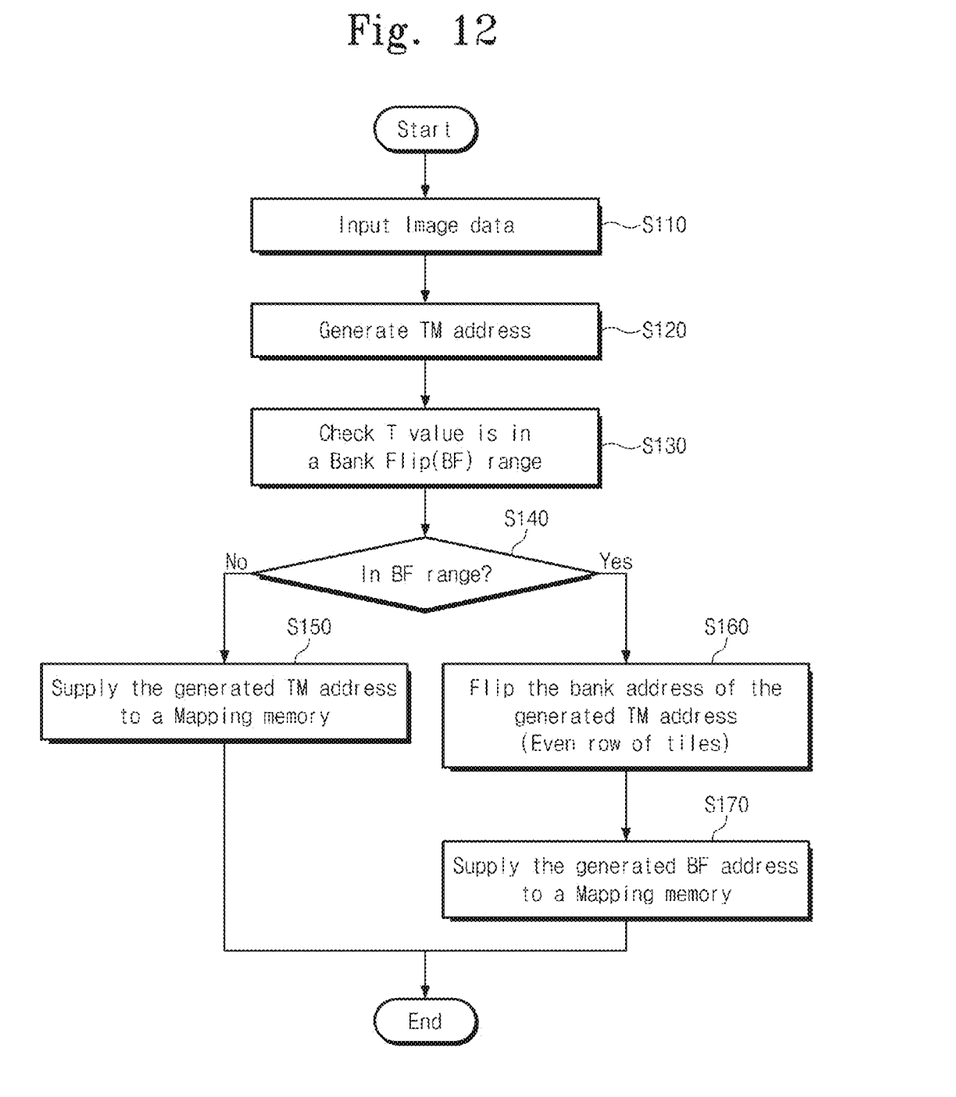
FIG. 12 is a flow chart illustrating a method of performing address mapping according to an embodiment of the inventive concept.

FIG. 12 is a flow chart illustrating a method of performing address mapping in a display system. For explanation purposes, it will be assumed that the method is performed in display system 1000 of FIG. 1. In the description that follows, example method steps will be indicated by parentheses (SXXX).

In the method of FIG. 12, image data is input to address generator 120 (S110). The image data comprises location (x, y) information and size (xsize, ysize) information of a selected image area, size information (ImgH, ImgV) of an image, and size information (TileH, TileV) of image tiles. In addition, specifications of mapping memory 200, which can be mounted on a system on chip (SoC) or memory module, can also be provided to address generator 120 to determine whether to perform bank flipping.

Next, a tile mapping address for storing the image data in mapping memory 200 is generated based on the image data (S120). The tile mapping address comprises sequentially ordered bank address assignments for the image tiles.

Thereafter, detector 124 applies equation (3) to the image data to determine whether the bank flip method, rather than the tile mapping method, should be used for address mapping. Detector 124 determines an address mapping method for storing the image in mapping memory 200 based on a format or a size of the image. Detector 124 can also calculate a number of tiles (T value) to be accommodated in a horizontal size of the image from the image data, and determine whether the number of tiles is in a range corresponding to the tile mapping method or the bank flip method (S140).

Where the T value is not in a range corresponding to the bank flip method (S140=No), detector 124 controls address select portion 123 to provide the tile mapping address from tile mapping address generator 121 to mapping memory 200 (S150). Otherwise (S140=Yes), detector 124 activates address converter 122, and address converter 122 modifies the tile mapping address output from tile mapping address generator 121 to generate a bank flip address for the bank flip method (S160). As described above, address converter 122 generates the bank flip address by modifying bank addresses of the tile mapping address for tiles located in even rows of the image. In some embodiments, address converter 122 toggles the most significant bit (MSB) of those bank addresses. By doing so, the image can be stored in mapping memory 200 with an improved degree of bank interleaving.

Where the bank flip method is determined as the address mapping method for the image, detector 124 controls address select portion 123 to provide the bank flip address output from address converter 124 to mapping memory 200 (S170).

As indicated by the foregoing, various embodiments of the inventive concept provide address mapping methods and related components that can improve the access time of a memory device by reducing various forms of overhead, such as Open-Row-Access delays.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method for mapping a tiled image to banks of a memory, the method comprising:
   assigning image information of a first plurality of pixel units corresponding to a first row of an image unit to a first linear address of the banks of the memory; and
   assigning image information of a second plurality of pixel units corresponding to a second row of the image unit to a second linear address of the banks of the memory;
   wherein the second row is adjacent to the first row, and the second linear address is consecutively in series with the first linear address; and
   wherein the tiled image is mapped to banks of the memory configured for selectively applying a bank flipping operation that includes toggling a most significant bit of the bank assignments.

2. The method of claim 1, wherein the image unit corresponds to a whole image frame, and the first and second plurality of pixel units correspond to a tile.

3. The method of claim 2, wherein a second tile address associated with a second tile of the first row is in series of a first tile address associated with a first tile of the first row.

4. The method of claim 3, wherein a fourth tile address associated with a first tile of the second row is in series of a third tile address associated with a last tile of the first row.

5. The method of claim 2, wherein the image information of the tile comprises a Luma component (Y) tile and a Chroma component (Cb/Cr) tile.

6. The method of claim 5, wherein the Luma component (Y) tile comprises different number of pixels from the Chroma component (Cb/Cr) tile.

7. The method of claim 1, wherein the image unit corresponds to a selected tile, and each of the first and second plurality of pixel units correspond to a single pixel.

8. The method of claim 7, wherein a second pixel address associated with a second pixel of the first row is in series of a first pixel address associated with a first pixel of the first row.

9. The method of claim 8, wherein a fourth pixel address associated with a first pixel of the second row is in series of a third pixel address associated with a last pixel of the first row.

10. The method of claim 7, further comprising:
    assigning an image information of a plurality of pixels located on a last row of the selected tile to a third linear address of the banks of the memory; and
    assigning an image information of a plurality of pixels located on a first row of a following tile to a fourth linear address of the banks of the memory,
    wherein the fourth linear address is in series of the third linear address.

11. The method of claim 10, wherein a tile row address of the following tile adjacent to the selected tile is same with a tile row address of the selected tile.

12. The method of claim 10, wherein the selected tile corresponds to a last column of the tiled image, the following tile corresponds to a first column of the tiled image,
    wherein a tile row address of the following tile is different from a tile row address of the selected tile.

13. A display system, comprising:
    a processor supplying image data defining a tiled image;
    a memory storing the image data by a tile unit; and
    an address generator generating an address to store the image data to banks of the memory,
    wherein the address generator assigns image information of a first plurality of pixel units corresponding to a first row of the image data to a first linear address of the banks of the memory, and assigns image information of a second plurality of pixel units corresponding to a second row of the image data to a second linear address of the banks of the memory, wherein the second row is adjacent to the first row, and the second linear address is consecutively in series with the first linear address, wherein the tiled image is mapped to banks of the memory configured for selectively applying a bank flipping operation that includes toggling a most significant bit of the bank assignments.

14. The system of claim 13, wherein the image data corresponds to a whole image frame, and each of the first and second plurality of pixel units corresponds to a tile.

15. The system of claim 14, wherein a second tile address associated with a second tile of the first row is in series of a first tile address associated with a first tile of the first row.

16. The system of claim 14, wherein a fourth tile address associated with a first tile of the second row is in series of a third tile address associated with a last tile of the first row.

17. The system of claim 13, wherein the image data corresponds to a selected tile, and each of the first and second plurality of pixel units correspond to a single pixel.

18. The system of claim 17, wherein a second pixel address associated with a second pixel of the first row is in series of a first pixel address associated with a first pixel of the first row.

19. The system of claim 17, wherein a fourth pixel address associated with a first pixel of the second row is in series of a third pixel address associated with a last pixel of the first row.

* * * * *